J. J. MALONE.
VEHICLE DOOR LATCH.
APPLICATION FILED JAN. 15, 1912.
1,035,617.
Patented Aug. 13, 1912.
2 SHEETS—SHEET 1.
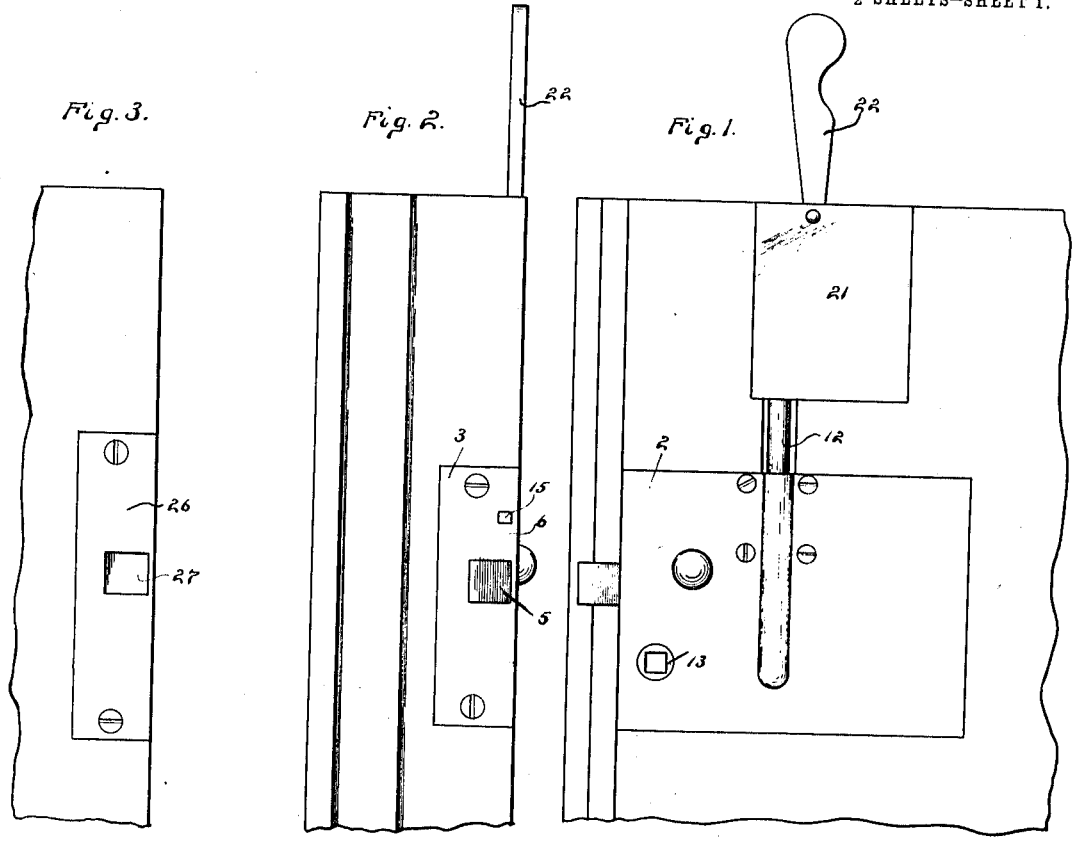
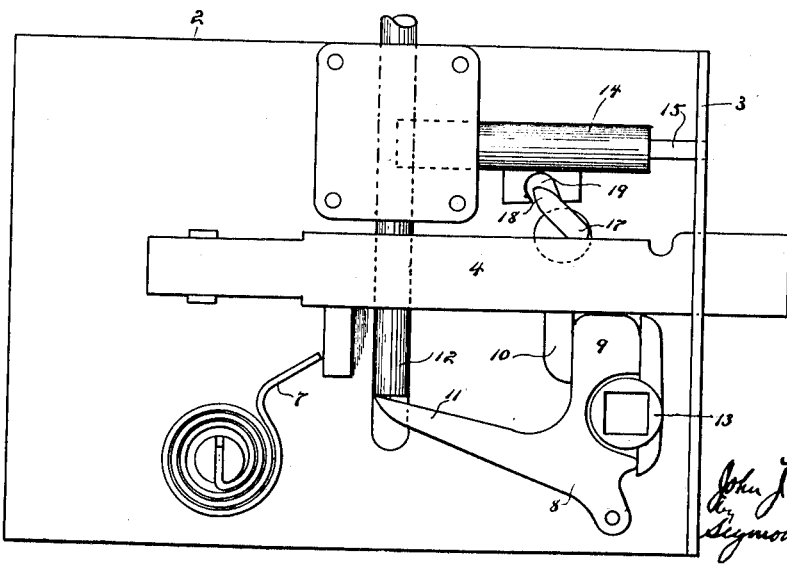

J. J. MALONE.
VEHICLE DOOR LATCH.
APPLICATION FILED JAN. 15, 1912.
1,035,617.
Patented Aug. 13, 1912.
2 SHEETS—SHEET 2.
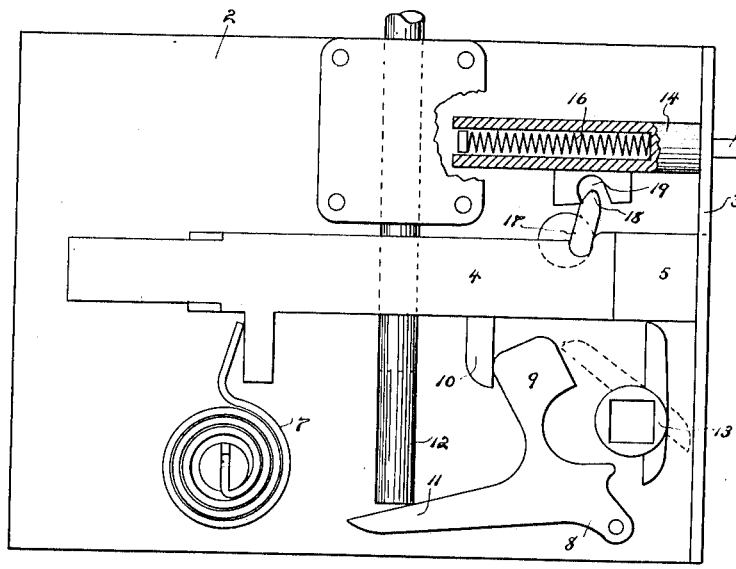
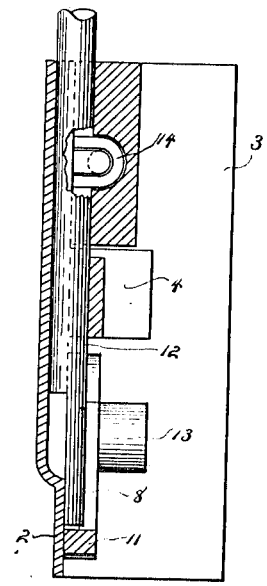
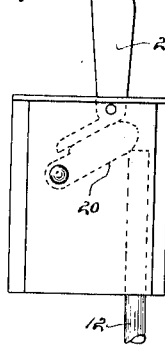
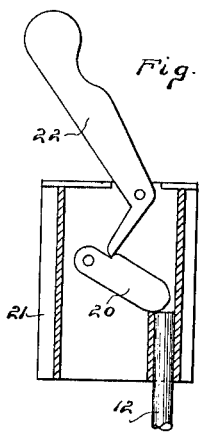
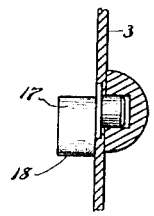
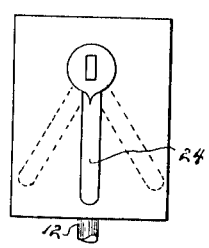
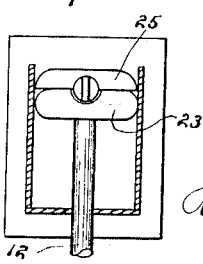

UNITED STATES PATENT OFFICE.

JOHN J. MALONE, OF NEW HAVEN, CONNECTICUT.

VEHICLE DOOR-LATCH.

1,035,617.  Specification of Letters Patent.  Patented Aug. 13, 1912.

Application filed January 15, 1912. Serial No. 671,390.

*To all whom it may concern:*

Be it known that I, JOHN J. MALONE, a citizen of the United States, residing at New Haven, in the county of New Haven and State of Connecticut, have invented a new and useful Improvement in Vehicle Door-Latches; and I do hereby declare the following, when taken in connection with the accompanying drawings and the characters of reference marked thereon, to be a full, clear, and exact description of the same, and which said drawings constitute part of this specification, and represent, in—

Figure 1 an inside view of a portion of a vehicle door showing my improved latch applied thereto, it being understood that the upholstery usually employed is omitted. Fig. 2 an edge view of the same. Fig. 3 a face view of the striker-plate. Fig. 4 an inside view of the latch mechanism shown in the locked position, on an enlarged scale. Fig. 5 a similar view partly in section, showing the latch bolt in its retired position. Fig. 6 a sectional view on the line tion. Fig. 6 a sectional view on the line $a-b$ of Fig. 5. Fig. 7 a sectional view of the eccentric connection between the latch bolt and auxiliary latch. Fig. 8 an inside view of the lever mechanism for operating the latch. Fig. 9 a sectional view of the same parts shown, with the lever turned to retire the latch bolt. Fig. 10 a face view illustrating a modified form of rod-operating mechanism. Fig. 11 a sectional view of the same.

This invention relates to an improvement in vehicle door latches, and particularly for vehicle doors where a knob or handle is arranged on the outside of the door and a lever on the inside of the door. Latches for vehicles, and especially for automobiles, require a strong spring, and in closing the door the latch bolt must be retired against the tension of this spring. This requires not only considerable force, but causes more or less jar to the parts and tends to either spring the hinges or to break the edge of the door carrying the usual striker.

The object of this invention is to provide means whereby when the door is open the latch will be retired. Then when the door is closed, the latch will be tripped to engage with its keeper; and the invention consists in the construction hereinafter described and particularly recited in the claims.

In carrying out my invention, I employ a latch-case or plate 2 formed with the usual flange 3 overlapping the edge of the door. Mounted for longitudinal movement on this plate is a latch bolt 4 having the usual beveled nose 5 projecting through a clearance opening 6 formed for it in the front plate or flange 3. This latch is normally thrown forward by a spring 7, and is adapted to be returned by a bell-crank lever 8 one arm 9 of which engages with a lug 10 depending from the bolt, the other arm 11 extending beneath a vertically arranged rod 12 which may be operated as will be later described. This bell-crank lever 8 is turned by a roll-back 13 operated from outside by a suitable knob or handle, and it will be noted that this roll-back is located very near the front edge of the lock, and consequently the knob spindle which operates it extends through the solid part or molding of the door, and the knob spindle will not interfere with the movement of the window if one is used. The lever handle is pivoted so near the upper edge of the door that but little cutting is required for its movement. Above the latch bolt 4 is an auxiliary latch bolt 14 having a beveled nose 15 projecting out through a clearance slot formed for it in the flange 3. This latch bolt is normally thrown forward by a spiral spring 16, and is in engagement with the latch bolt 4. This may be in any desired manner. As herein shown, an eccentric cam 17 is mounted in the casing in position to engage with the bolt, and the upper end 18 of the cam enters a notch 19 formed in the auxiliary bolt 14. The spindle 12 extends upward into engagement with a lever 20 mounted in an auxiliary case 21 located at the top of the door, and this lever 20 is adapted to be operated by a lever handle 22 and so that when the lever handle is drawn it will move the lever 20 so as to depress the rod 12. It will also be noted that the roll-back may be turned in either direction and operate the bell-crank lever.

Instead of pivoting the lever 20 at one end, as shown in Figs. 8 and 9 of the drawings, which requires that the lever handle be drawn in one direction, the spindle 12 may be provided with a cross-head 23, and a handle 24 connected with a rock-cam 25 as shown in Figs. 11 and 12 so that the lever may be moved in either direction to depress the rod. The strike-plate 26 is provided with an opening 27 to receive the nose 5 of the latch bolt 4. When the door is closed, the parts are in the position shown in Fig. 4, with the nose 5 of the latch engaging with the keeper. If the door is opened from the outside, the roll-back 13 is turned by the knob, and this roll-back 13 moves the bell-crank lever 8 forcing the arm 9 against the lug 10 and crowding the latch bolt 4 rearward and against the tension of the spring 7. This rearward movement of the latch bolt turns the eccentric 17 and throws the auxiliary bolt 14 outward, this being thrown outward by the tension of the spring 16. The same result is accomplished by drawing the lever 22 so as to crowd the rod 12 downward against the arm 11 of the bell-crank lever 8 and so as to retire the bolt. In either case the bolt when retired, is held so by the eccentric 17. Now when the door is closed the nose 15 of the auxiliary latch strikes the keeper and forces this latch inward, and when the door is fully closed the eccentric will have moved sufficiently to release the latch bolt 4 so as to allow it to be thrown forward by the spring 7. Thus in closing the door, the only resistance is the spring 16, and as this is a comparatively light spring, it follows that the door may be closed without difficulty and without undue strain or jar.

I claim:—

1. In a latch, the combination with the main bolt, of a spring normally tending to throw it forward, an auxiliary spring-operated latch arranged parallel with the main bolt, connection between the auxiliary latch and the main bolt whereby when the latch bolt is retired, the auxiliary latch will be thrown forward, and when the auxiliary latch is retired the latch bolt will be released, and means independent of the auxiliary latch for retiring the main bolt.

2. A vehicle door latch including a latch bolt, a spring tending to throw the same outward, a bell-crank lever having one arm in engagement with said latch bolt, means for turning the bell-crank lever for retiring the bolt, an auxiliary spring-operated latch, an eccentric arranged between the latch bolt and the auxiliary latch whereby when the latch bolt is retired the auxiliary latch will be thrown forward, and vice versa.

3. In a vehicle door latch, the combination with the latch bolt, of a spring tending to throw the same forward, a bell-crank lever having one arm in engagement with the latch, a roll-back adapted to engage with said arm for forcing it against the bolt, a vertically arranged rod engaging with the other arm of the bell-crank lever and adapted when depressed to turn the same, means for depressing the said rod, an auxiliary spring-operated latch, and connections between the auxiliary latch and the latch bolt whereby when the latch bolt is retired, the latch bolt will be held and the auxiliary latch thrown forward, and when the auxiliary latch is returned it will release the latch bolt.

In testimony whereof, I have signed this specification in the presence of two subscribing witnesses.

JOHN J. MALONE.

Witnesses:
 FREDERIC C. EARLE,
 CLARA L. WEED.